(12) United States Patent
Fritsch et al.

(10) Patent No.: US 9,993,909 B2
(45) Date of Patent: Jun. 12, 2018

(54) METHOD AND SYSTEM FOR MANUFACTURING A GRINDING TOOL

(71) Applicant: Robert Bosch GmbH, Stuttgart (DE)

(72) Inventors: Stephan Fritsch, Bottighofen (CH); Josef Breitenmoser, Frauenfeld (CH); Bruno Germann, Dozwil (CH)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 14/631,193

(22) Filed: Feb. 25, 2015

(65) Prior Publication Data
US 2015/0239096 A1 Aug. 27, 2015

(30) Foreign Application Priority Data
Feb. 25, 2014 (DE) .................. 10 2014 203 329

(51) Int. Cl.
| | |
|---|---|
| B24D 11/00 | (2006.01) |
| B23K 26/38 | (2014.01) |
| B23K 26/362 | (2014.01) |
| B23K 26/40 | (2014.01) |
| B24D 3/28 | (2006.01) |
| B23K 26/08 | (2014.01) |
| B23K 101/16 | (2006.01) |
| B23K 103/16 | (2006.01) |
| B23K 103/00 | (2006.01) |

(52) U.S. Cl.
CPC ........ *B24D 11/008* (2013.01); *B23K 26/0846* (2013.01); *B23K 26/38* (2013.01); *B23K 26/40* (2013.01); *B24D 3/28* (2013.01); *B24D 11/00* (2013.01); *B23K 2201/16* (2013.01); *B23K 2203/16* (2013.01); *B23K 2203/40* (2015.10); *B23K 2203/42* (2015.10); *B23K 2203/50* (2015.10)

(58) Field of Classification Search
CPC ..... B24D 11/00; B24D 11/001; B24D 11/005; B24D 11/008; B24D 3/28; B23K 26/0846; B23K 26/362; B23K 26/38; B23K 26/40; B23K 26/402
USPC ........................................................ 451/527
See application file for complete search history.

(56) References Cited

U.S. PATENT DOCUMENTS

| | | | | |
|---|---|---|---|---|
| 5,201,147 | A * | 4/1993 | Francis | B24D 15/026 15/105 |
| 5,851,142 | A * | 12/1998 | Bullock | B24D 13/04 451/464 |
| 6,142,045 | A * | 11/2000 | Coxe | B24D 11/008 83/202 |
| 2003/0047695 | A1* | 3/2003 | Zik | B23K 26/0846 250/559.32 |
| 2004/0235406 | A1* | 11/2004 | Duescher | C09K 3/1436 451/527 |
| 2005/0118939 | A1* | 6/2005 | Duescher | B24D 11/00 451/527 |
| 2011/0073576 | A1* | 3/2011 | Bucklew | B23K 26/0846 219/121.72 |

(Continued)

*Primary Examiner* — Eileen Morgan
(74) *Attorney, Agent, or Firm* — Maginot, Moore & Beck LLP (57) ABSTRACT

A method for manufacturing a grinding tool which has a binding agent based on aromatic molecules includes cutting an abrasive material parent web with a laser device to form at least one inner contour of the grinding tool, and punching out an outer contour of the grinding tool from the abrasive material parent web.

3 Claims, 6 Drawing Sheets

(56) References Cited

U.S. PATENT DOCUMENTS

2011/0257779 A1* 10/2011 Theis ................... G05B 19/404
                                                  700/110
2014/0045413 A1*  2/2014 Breitenmoser ......... B24B 55/06
                                                  451/527
2016/0304386 A1* 10/2016 Dong ................... B23K 26/388

* cited by examiner

METHOD AND SYSTEM FOR MANUFACTURING A GRINDING TOOL

This application claims priority under 35 U.S.C. § 119 to patent application no. DE 10 2014 203 329.2, filed on Feb. 25, 2014 in Germany, the disclosure of which is incorporated herein by reference in its entirety.

BACKGROUND

A method for manufacturing a grinding tool comprising a urea-based binding agent has already been proposed, wherein contours of the grinding tool are cut by means of a laser device. Only a small quantity of soot particles is herein generated.

SUMMARY

A method for manufacturing a grinding tool comprising a binding agent based on aromatic molecules is proposed, wherein at least one inner contour of the grinding tool is cut by means of a laser device, and wherein an outer contour of the grinding tool is punched out of an abrasive material parent web.

By "manufacturing" should be understood, in this context, in particular at least one process in which at least one shape of the grinding tool is produced. Preferably, in the course of manufacture, grinding dust extraction openings are made in the grinding tool and the grinding tool is cut out of an abrasive material parent web. By a "grinding tool" should be understood, in particular, an insert tool of a tool for abrasive machining, for instance a grinding wheel. Preferably, the grinding tool comprises a grinding surface beset with abrasive grains. In particular, the abrasive grains are applied, in particular by means of the binding agent, on a substrate. By the expression "based on aromatic molecules" should be understood, in particular, that the binding agent has molecules having an aromatic ring. Preferably, the binding agent is configured as a phenolic resin. In particular, the binding agent is formed by a polycondensation of phenol and formaldehyde. By a "binding agent" should be understood, in particular, an agent which connects at least two components of the grinding tool. Preferably, the binding agent binds at least the abrasive grains and the substrate, in particular a paper layer, a fabric layer and/or a film layer, one to the other. Alternatively or additionally, the binding agent could connect at least a plurality of regions of the substrate one to another and advantageously harden the substrate.

By an "inner contour" should be understood, in particular, a part of a shape of the grinding tool, on at least one plane, is enclosed by the grinding tool. Preferably, the inner contour delimits recesses of the grinding tool which appear sensible to the person skilled in the art, preferably, however, a grinding dust extraction opening. By the expression "cut by means of a laser device" should be understood, in particular, that the contour of the grinding tool is generated by burning a shape out of a blank, in particular the abrasive material parent web, using the power of a laser. Preferably, the laser device cuts the grinding tool from a side facing away from the grinding surface.

By an "outer contour" should be understood, in particular, a contour of the grinding tool which defines a size and external shape of the grinding tool, in particular parallel to a plane of principal extent of the grinding tool. The grinding tool has an outer contour which appears sensible to the person skilled in the art, yet is preferably circular. Alternatively, the grinding tool could be triangular, for instance. By an "abrasive material parent web" should be understood, in particular, a web-shaped blank from which a plurality of grinding tools are separated. By the term "punched out" should be understood, in particular, that the grinding tool is cut out of the abrasive material parent web by a punching knife, which defines the nominal shape of the grinding tool. Preferably, edges of the grinding tool are rounded as this is punched out of the abrasive material parent web. A situation in which a user of the grinding tool cuts himself on the edges of the grinding tool can thereby be avoided. Furthermore, abrasive grains of the grinding tool which are disposed on the edge are deformed in the punching, whereby a particularly smooth edge, in particular without projecting abrasive grains, can be achieved.

By virtue of the disclosed design of the method, a depositing of soot particles on the grinding tool when the grinding tool is separated from the abrasive material parent web can advantageously be completely avoided. Hence a packing of the grinding tool, a user of the grinding tool, and a workpiece machined with the grinding tool can be prevented from being dirtied by the grinding tool. In addition, a situation in which the outer contour of the grinding tool is substantially influenced by a tension of the abrasive material parent web can be avoided.

It is further proposed that, by means of the laser device, a synchronization marking can be applied to the abrasive material parent web, whereby a particularly accurate punching-out of the grinding tool is easily possible in design terms. By a "synchronization marking" should be understood, in particular, a marking which, in at least one operating state, is registered in order to determine a positioning of the abrasive material parent web, in particular relative to a punching knife of a punching device. In particular, the synchronization marking is optically registered prior to a punching process, in particular by means of an illuminant which appears sensible to the person skilled in the art and an optical sensing means which appears sensible to the person skilled in the art. Preferably, the illuminant is configured as a laser, and the sensing means as a laser detector. Alternatively or additionally, a position of the abrasive material parent web could be registered by the contour made in the abrasive material parent web by means of the laser device, for instance an imaging system, in particular a camera, could register the grinding dust extraction openings.

In addition, the disclosure is based on a method for manufacturing a grinding tool comprising a binding agent based on aromatic molecules, wherein at least one inner contour and one outer contour of the grinding tool are cut by means of at least one laser device, and wherein soot particles formed in a cutting process of the inner contour and the outer contour are extensively evacuated. Preferably, the inner contour and the outer contour of the grinding tool are cut in separate work steps, in particular with different laser devices. Preferably, the inner contour is cut first, followed by the outer contour. Alternatively, the inner contour and the outer contour of the grinding tool could be cut in a same work step and/or with a same laser device.

By a "cutting process" should be understood, in particular, a process in which a part of the blank that forms a grinding tool is separated from a remainder of the blank, in particular the abrasive material parent web. Preferably, a plurality of grinding tools are cut out of a blank. By "soot particles" should be understood, in particular, particles which are formed by the scorching of at least the binding agent when the contour is burnt out, in particular as a result of reaction with atmospheric oxygen. In particular, the soot particles, when deposited on the grinding tool, form an at least visual contamination of the grinding tool.

By the term "extensively evacuated" should be understood, in particular, that the soot particles are transported away from the grinding tool by means of a gas volume flow, which, on a plane adjoining the grinding tool, has a possible evacuation surface which comprises at least 40%, advantageously at least 60%, particularly advantageously at least 80%, of a surface of a plane of principal extent of the grinding tool. In particular, the plane of the evacuation surface is oriented parallel to the plane of principal extent of the grinding tool. In particular, the evacuation surface is oriented parallel to the plane of principal extent of the grinding tool. In particular, the evacuation surface of a single grinding tool is at most exactly as large as the surface of the plane of principal extent of the grinding tool, in particular because the soot particles must be led away from the grinding tool. Preferably, a cutting board delimits a size of the evacuation surface. In particular, the evacuation surface is configured as a suction surface delimited by the cutting board. The disclosed design of the method can mean that the soot particles settle only to a small extent on the grinding tool. The cost and effort of cleaning the grinding tool after manufacture can thus be significantly reduced.

It is further proposed that at least the grinding tool, in a cutting process of the outer contour, is fixed on a cutting board by means of an underpressure, whereby a situation in which an outer contour of the grinding tool is influenced by a tension of the abrasive material parent web can advantageously be avoided. Moreover, an outer contour of the grinding tool can also be cut without the cutting tool falling out of the abrasive material parent web. By a "cutting board" should be understood, in particular, a means on which the grinding tool, and, in particular, the abrasive material parent web, rest in the course of the cutting process. In particular, the cutting board is made of a substantially laser-resistant material which appears sensible to the person skilled in the art, preferably, however, of a polyethylene plastic or a polypropylene plastic. By the expression "fix by means of an underpressure" should be understood, in particular, that on that side of the grinding tool that is facing towards the cutting board is generated a gas pressure which is less than the gas pressure on that side of the grinding tool that is facing away from the cutting board.

It is also proposed that the cutting process of the inner contour is realized on a free-hanging region of the abrasive material parent web, whereby a particularly small depositing of soot particles on the grinding tool can be achieved. By a "free-hanging region" should be understood, in particular, a region of the abrasive material parent web that comprises at least the surface of a grinding tool and that is held only by adjoining regions of the abrasive material parent web. Preferably, the abrasive material parent web is tensioned for fixing of the free-hanging region. In particular, the free-hanging region sags less than 2 mm, advantageously less than 1 mm, particularly advantageously less than 0.5 mm.

In a further embodiment, it is proposed that the inner contour delimits a grinding dust extraction opening, whereby an effective grinding tool can be manufactured with small deposits of soot particles on the grinding tool. By a "grinding dust extraction opening" should be understood, in particular, an opening in the grinding tool which is designed to, in a grinding process, lead grinding dust away from the abrasive grains. Preferably, the grinding tool has more than 5, advantageously more than 15, particularly advantageously more than 50 grinding dust extraction openings. Preferably, the grinding tool has more than one grinding dust extraction opening per square meter of surface on the plane of principal extent of the grinding tool.

In addition, the disclosure is based on a system for manufacturing a grinding tool comprising at least one laser device, which latter, in the course of manufacture, cuts at least one inner contour of the grinding tool.

It is proposed that the system has a punching device, which is designed to punch out the grinding tool, comprising a binding agent based on aromatic molecules, from an abrasive material parent web. By virtue of the disclosed design of the system, a depositing of soot particles on the grinding tool when the grinding tool is separated from the abrasive material parent web can advantageously be completely avoided.

The disclosure is further based on a system for manufacturing a grinding tool comprising at least one laser device, which latter, in the course of manufacture, cuts at least one inner contour of the grinding tool.

It is proposed that the system has a soot evacuation device, which is designed to, in a cutting process of an outer contour of the grinding tool comprising a binding agent based on aromatic molecules, extensively evacuate formed soot particles. By a "soot evacuation device" should be understood, in particular, a device which, in the course of the cutting process, conducts a gas volume flow containing the soot particles away from the grinding tool. Preferably, the soot evacuation device has at least one fan, which generates the gas volume flow. Alternatively, the soot particles can be extensively evacuated from the grinding tool in another way which appears sensible to the person skilled in the art, for instance by means of a gas volume flow which, on the basis of the heat formed in the cutting process, is generated by natural ventilation. By "designed" should be understood, in particular, specially programmed, arranged and/or equipped. By an object being designed for a specific function should be understood, in particular, that the object fulfils and/or executes this specific function in at least one state of application and/or operating state. The disclosed design of the system can mean that the rust particles settle on the grinding tool only in small measure. The cost and effort of cleaning the grinding tool after manufacture can thus be significantly reduced. Moreover, tool wear in the manufacture of the grinding tool can advantageously be avoided. Furthermore, different shapes can be cut one after another without any intervening set-up time.

It is further proposed that the system has a cutting board having a supporting surface which is smaller than a suction surface delimited by the cutting board, whereby the soot particles formed in the cutting process can be removed from the grinding tool over an advantageously large region. By a "supporting surface" should be understood, in particular, a surface of the cutting board which, in at least one operating state, supports the grinding tool and, advantageously, at least one region of the abrasive material parent web. Preferably, the supporting surface produces on the grinding tool a force which counters a force produced by the underpressure. In particular, the supporting surface fixes the grinding tool and, advantageously, the abrasive material parent web by friction locking. By a "suction surface" should be understood, in particular, a surface through which the gas volume flow, on the side facing towards the cutting board, can flow away from the grinding tool. Preferably, the suction surface is spanned by recesses, which are delimited by the cutting board. Preferably, the soot particles are extracted from the grinding tool through the suction surface. By the term "delimit" should in this context be understood, in particular, that the suction surfaces are fully enclosed, on at least one plane, by the cutting board.

It is also proposed that the supporting surface is spanned by an open supporting structure of the cutting board, whereby a high stability and an advantageously small supporting surface can be achieved. By an "open supporting structure" should be understood, in particular, a structure of the cutting board which delimits cavities arranged distributed on a plane of principal extent of the cutting board. Preferably, the open supporting structure is configured as a honeycomb structure. The cavities have on the plane of principal extent advantageously a preferably round honeycomb shape. Alternatively or additionally, a structure of the cutting board could delimit cavities having another honeycomb shape which appears sensible to the person skilled in the art, for instance a hexagonal, triangular, rectangular, square and/or trapezoidal shape. Furthermore, the supporting structure could have other supporting means which have other supporting means which appears sensible to the person skilled in the art, for instance mutually spaced columns. By "span" should be understood, in particular, that the supporting structure lends the cutting board, on the plane of principal extent, a stable shape.

In an advantageous configuration of the disclosure, it is proposed that the cutting board has a film layer oriented parallelly to the supporting surface, whereby the abrasive material parent web can be effectively sucked up with an advantageously small gas volume flow. By a "film layer" should be understood, in particular, a layer which limits gas permeability of the cutting board, i.e., in particular in at least one operating state, reduces it by 50%. Alternatively, the open supporting structure could be open on the side delimited by the supporting surface and on the side lying opposite this first side. In particular, openings of the honeycomb structure could be uncovered on both sides.

It is additionally proposed that the film layer has at least one suction opening, whereby a defined small gas volume flow for sucking up the abrasive material parent web is possible. By "suction openings" should be understood, in particular, openings which are delimited by the film layer and through which the limited gas volume flow can escape from the cutting board, in particular from the cavities of the supporting structure. Alternatively or additionally, the film layer could be configured as a membrane layer which is permeable to a limited gas volume flow. Preferably, the film layer has for each cavity of the supporting structure at least one suction opening.

Alternatively, the contours which delimit the grinding dust extraction openings could be cut in a first cutting process, preferably with a laser device, in particular into a free-hanging region of the abrasive material parent web, and the outer contour could be cut in a second cutting process, in particular with another laser device, on the cutting board. It is additionally proposed that the cutting board has a stabilizing layer oriented parallel to the supporting surface, whereby a particularly high stability can be achieved. Furthermore, the film layer is advantageously protected. By a "stabilizing layer" should be understood, in particular, a layer which is designed to strengthen the cutting board, in particular the supporting structure of the cutting board. Preferably, the stabilizing layer closes off one side of the supporting structure in a gas-permeable manner. Advantageously, the stabilizing layer is configured as a nonwoven layer. In particular, the stabilizing layer and the film layer can be configured at least partially in one piece.

The method according to the disclosure and the system according to the disclosure are here not intended to be limited to the above-described application and embodiment. In particular, the system according to the disclosure, in order to implement a working method described herein, can have a number, differing from a herein stated number, of individual elements, components and units.

BRIEF DESCRIPTION OF THE DRAWINGS

Further advantages emerge from the following drawing description. In the drawing, two illustrative embodiments of the disclosure are represented. The drawing, the description and the claims contain numerous features in combination. The person skilled in the art will expediently also view the features in isolation and put them together into sensible further combinations.

DETAILED DESCRIPTION

Figure 1:
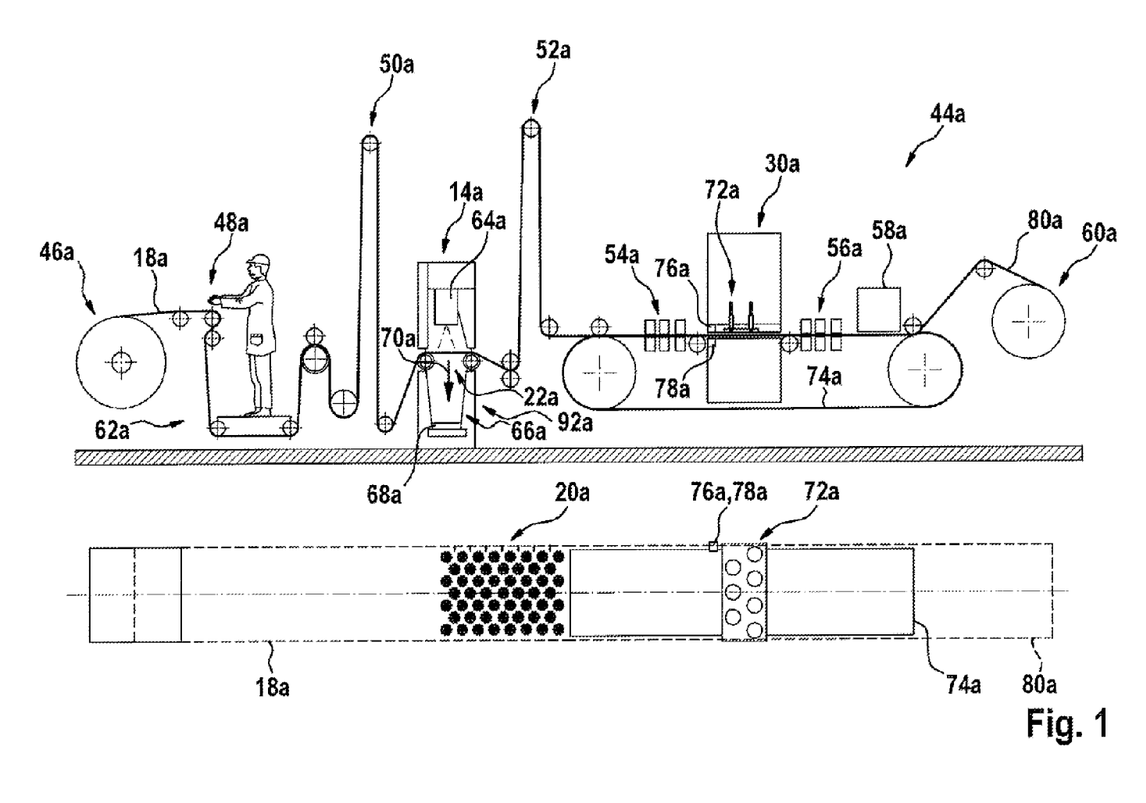
FIG. 1 shows a system according to the disclosure for manufacturing a grinding tool, comprising a laser device and a punching device.
Figure 2:
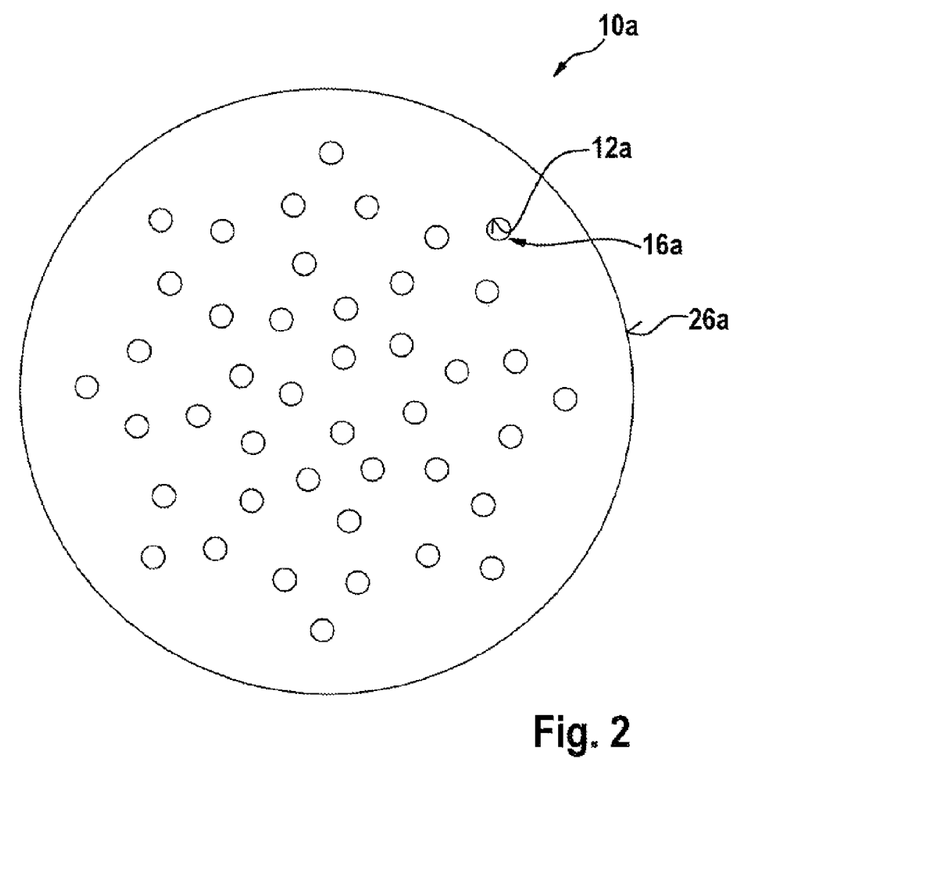
FIG. 2 shows a grinding tool manufactured by means of a system according to the disclosure.

FIG. 1 shows a system 44a according to the disclosure for implementing the disclosed method for manufacturing grinding tools 10a represented in FIG. 2. The system 44a has an unreeling device 46a, a web connection point 48a, a first dancer 50a, a laser device 14a, a second dancer 52a, a first clamping feed 54a, a punching device 30a, a second clamping feed 56a, a pickup robot 58a, and a reeling device 60a.

The unreeling device 46a unreels an abrasive material parent web 18a from a roll. The abrasive material parent web 18a comprises a substrate, abrasive grains and a binding agent based on aromatic molecules. The binding agent binds the substrate and the abrasive grains one to the other. The abrasive material parent web 18a is of flexible configuration.

A roller system 62a transports the abrasive material parent web 18a to the first dancer 50a and onward through said devices in the specified sequence. At the web connection point 48a, if the roll of the abrasive material parent web 18a is used up, a new roll with a new abrasive material parent web 18a is put in place. The first dancer 50a tautens the abrasive material parent web 18a to a predefined tension. To this end, the dancer 50a has at least one movable roller.

With this tension, the abrasive material parent web 18a is guided through the laser device 14a. In a cutting process, a laser 64a of the laser device 14a cuts inner contours 12a of the grinding tools 10a into the abrasive material parent web 18a by means of a laser beam. The inner contours 12a of the grinding tools 10a delimit grinding dust openings 16a of the grinding tools 10a. The laser 64a is configured as a $CO_2$ laser.

Moreover, by means of the laser device 14a, synchronization markings 20a are applied to the abrasive material parent web 18a. The synchronization markings 20a are configured as slits in the abrasive material parent web 18a.

The cutting process of the laser device 14a is realized on a free-hanging region 22a of the abrasive material parent web 18a. A soot evacuation device 92a extensively evacuates soot particles, formed in the cutting process, on a side of the abrasive material parent web 18a that is facing away from the laser 64a, through the (due to the free-hanging region 22a) free space 66a. To this end, a fan 68a of the soot evacuation device 92a generates a gas volume flow 70a. The gas volume flow 70a is here configured as an airflow.

The second dancer 52a is disposed between the first clamping feed 54a and the laser device 14a. Before the second dancer 52a, an advancement of the abrasive material parent web 18a is realized in a continuous feed. After the second dancer 52a, an advancement of the abrasive material parent web 18a is realized in a discontinuous feed. The discontinuous feed is generated by the first clamping feed 54a. The second dancer 52a equalizes differences in the feeds by means of a movably mounted roller.

After the second dancer 52a, the abrasive material parent web 18a is guided through the punching device 30a. The punching device 30a has punching knives 72a and a punching web 74a. In a punching process, the punching web 74a serves as a support. The punching web is supported in the punching process on a side facing away from the punching knives 72a. The punching web 74a is configured as a continuous web. The punching web 74a has a discontinuous feed, which is synchronous to the discontinuous feed of the abrasive material parent web 18a. To this end, at least one of the clamping feeds 54a, 56a acts on the punching web 74a. Alternatively to the punching web 74a, a punching device could have a punching plate, over which the abrasive material parent web 18a is guided.

The punching device 30a has a luminant 76a and an optical sensing means 78a. The luminant 76a and the optical sensing means 78a are disposed on different sides of the abrasive material parent web 18a. The luminant 76a shines through the synchronization marking 20a and the optical sensing means 78a registers the energy emitted by the luminant 76a. The punching device 30a determines from a signal pattern of an output signal of the optical sensing means 78a a position of the inner contours 12a relative to the punching knives 72a of the punching device 30a. The punching device 30a controls a feed of the abrasive material parent web 18a in dependence on the determined position. Alternatively, an illuminant and an optical sensing means could be disposed on a same side of the abrasive material parent web, wherein the optical sensing means detects changes in a reflected component of an energy emitted by the luminant.

In dependence on the determined position of the inner contours 12a, the punching knives 72a of the punching device 30a punch outer contours 26a of the grinding tools 10a out of the abrasive material parent web 18a. In the punching process, the punching knives 72a round the edges of the outer contours 26a.

The second clamping feed 56a guides the abrasive material parent web 18a out of the punching device 30a. The second clamping feed 56a here controls a tension of the abrasive material parent web 18a such that the outer contour 26a of the grinding tools 10a corresponds to a preset and is not influenced by different tensions and thus elongations of the abrasive material parent web 18a.

The pickup robot 58a separates the grinding tools 10a from a remainder 80a of the abrasive material parent web 18a. To this end, the pickup robot 58a has movable means which appear sensible to the person skilled in the art. The reeling device 60a reels the remainder 80a of the abrasive material parent web 18a onto a roll.

Beneath the representation of the system 44a, FIG. 1 shows an arrangement of the inner contours 12a of the grinding tools 10a on the abrasive material parent web 18a and an arrangement of the punching knives 72a.

In FIGS. 3 to 7, a further illustrative embodiment of the disclosure is shown. The following descriptions and the drawing are substantially confined to the differences between the illustrative embodiments, wherein, in relation to equally labeled components, in particular in relation to components with the same reference symbols, reference can basically be made also to the drawing and/or the description of the other illustrative embodiment, in particular of FIGS. 1 and 2. In order to differentiate between the illustrative embodiments, the letter a is suffixed to the reference symbols of the illustrative embodiment in FIGS. 1 and 2. In the illustrative embodiment of FIGS. 3 to 7, the letter a is replaced by the letter b.

Figure 3:
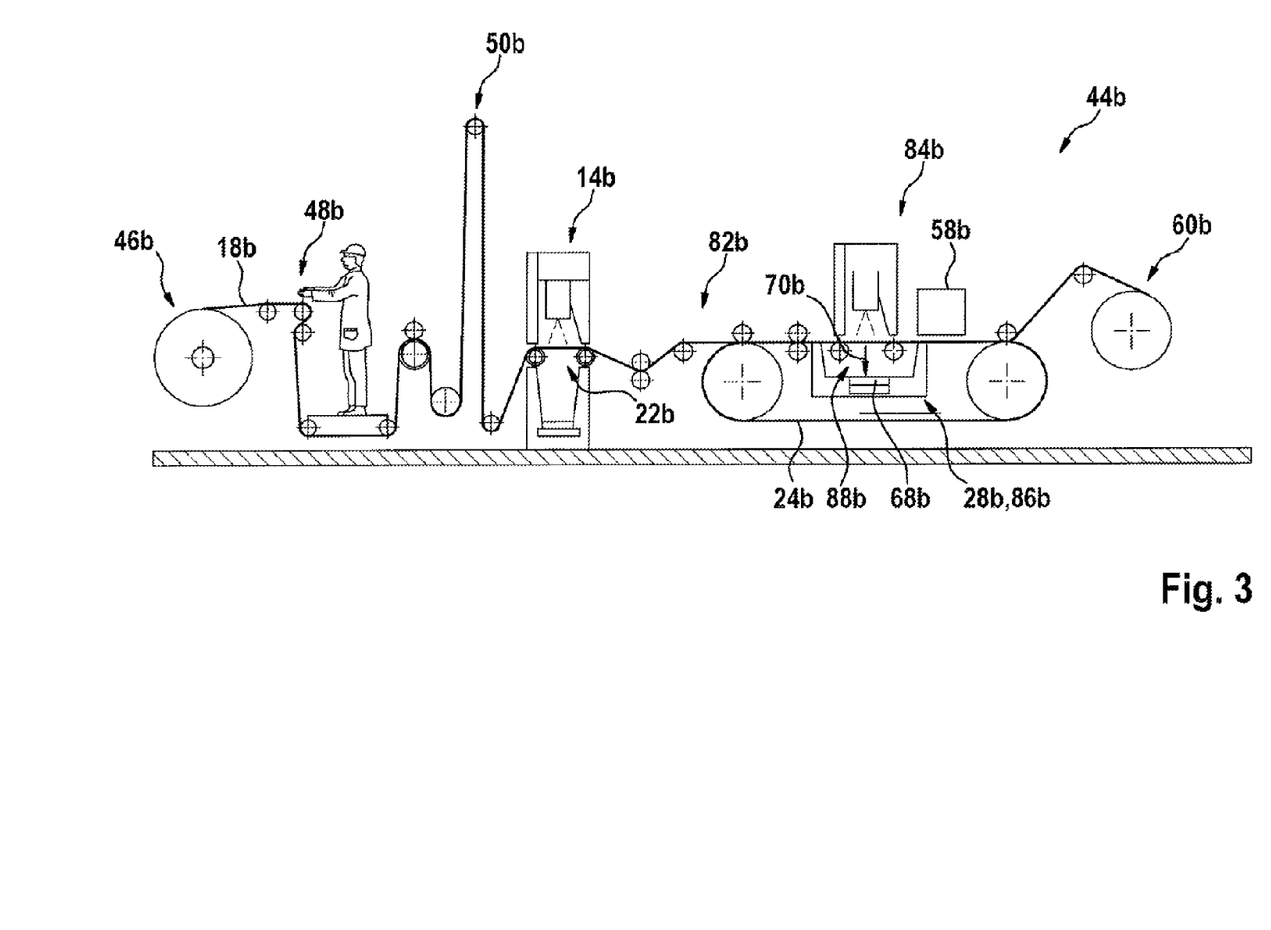
FIG. 3 shows a further, alternative illustrative embodiment of the system according to the disclosure, comprising a laser device and a cutting board.
Figure 4:
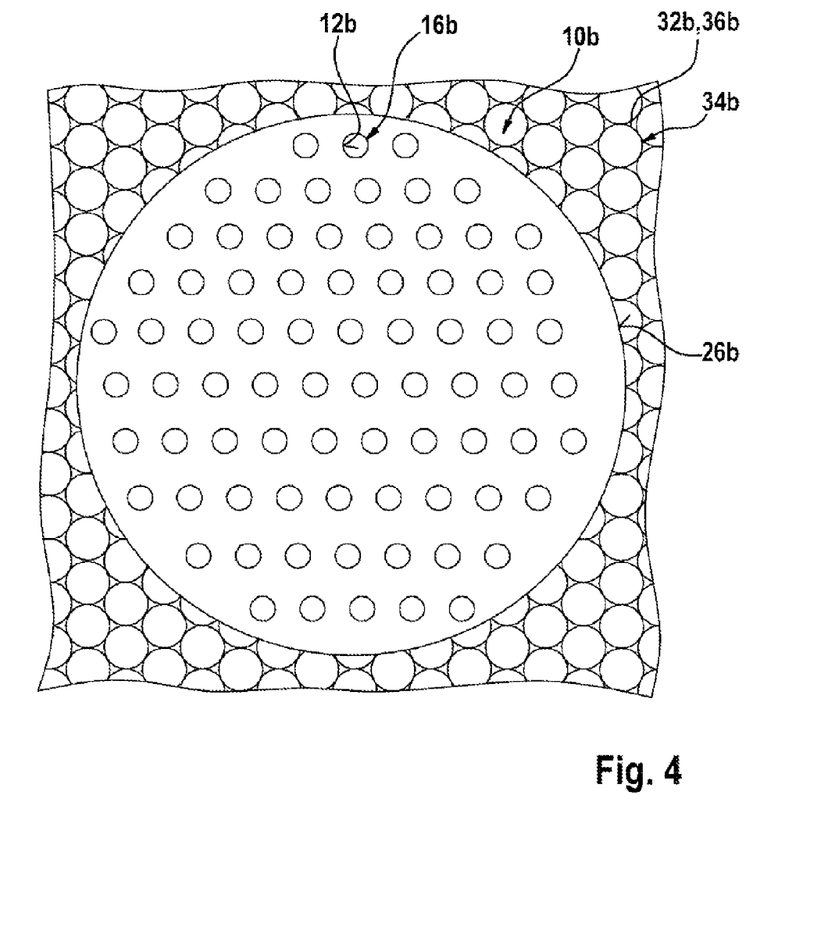
FIG. 4 shows a grinding tool manufactured with the system according to the disclosure, and the cutting board from FIG. 3.
Figure 5:
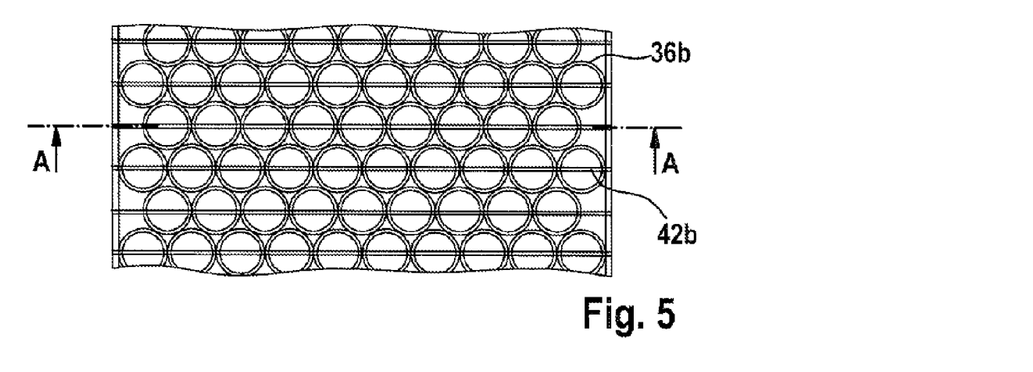
FIG. 5 shows a top view of the cutting board from FIG. 3.
Figure 6:
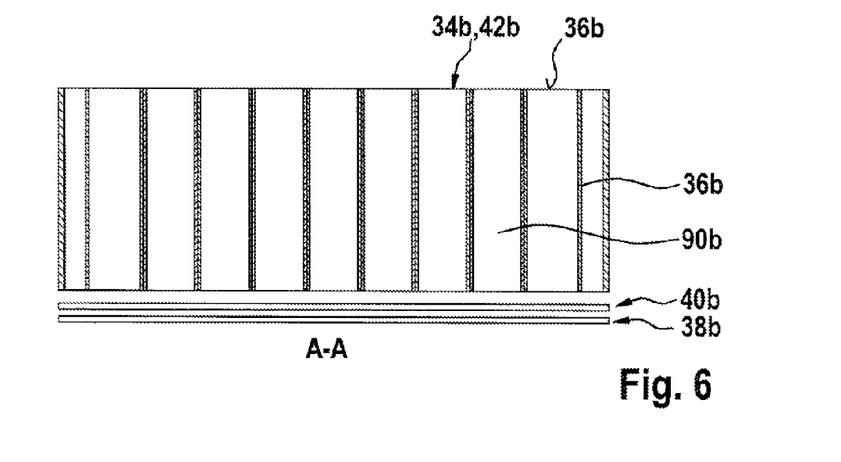
FIG. 6 shows a section A-A of the cutting board from FIG. 3.
Figure 7:
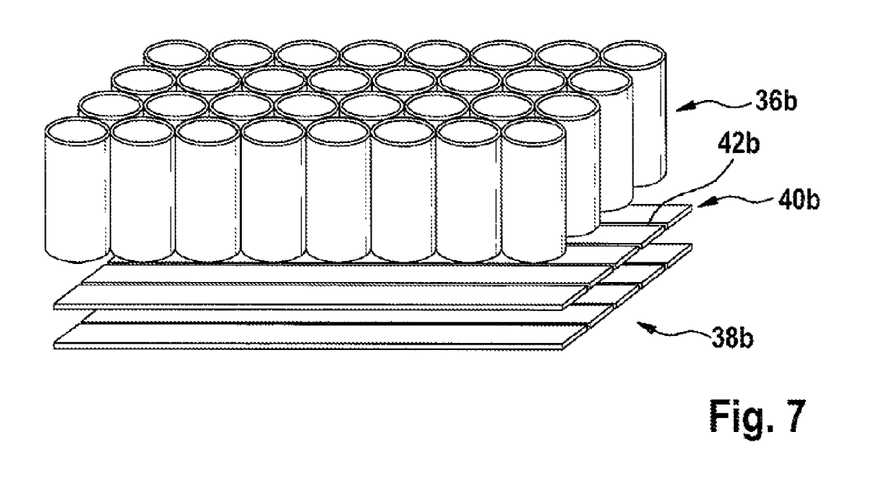
FIG. 7 shows a perspective view of the cutting board from FIG. 3.

FIG. 3 shows an alternative system 44b for manufacturing grinding tools 10b comprising a binding agent based on aromatic molecules. The system 44b has an unreeling device 46b, a web connection point 48b, a dancer 50b, a first laser device 14b, tension reduction rollers 82b, a second laser device 84b, a pickup robot 58b and a reeling device 60b.

A cutting process of inner contours 12b by means of the first laser device 14b is realized, as described in the first illustrative embodiment, on a free-hanging region 22b of an abrasive material parent web 18b. After this, the abrasive material parent web 18b is guided through the tension reduction rollers 82b, by means of which a tension of the abrasive material parent web 18b is reduced.

In a cutting process of outer contours 26b of the grinding tools 10b with the second laser device 84b, the abrasive material parent web 18b is fixed on a cutting board 24b of the system 44b by means of an underpressure. To this end, the system 44b has a suction device 86b, which, on a side 88b of a cutting board 24b that is facing away from the abrasive material parent web 18b, generates an underpressure by means of a fan 68b of the suction device 86b. The abrasive material parent web 18b is guided through the second laser device 84b with less tension than through the first laser device 14b.

The suction device 86b is configured in one piece with a soot evacuation device 28b of the system 44b. The soot evacuation device 28b is designed to extensively evacuate soot particles formed with the second laser device 84b in a cutting process of the outer contour 26b of the grinding tool 10b.

In the cutting process, the inner contours 12b and outer contours 26b of the grinding tools 10b, which contours delimit the grinding dust openings 16b, are cut by the different laser devices 14b, 84b. Alternatively or additionally, the inner contours 12b and the outer contours 26b are cut with a same laser device, wherein cuttings of the inner contours 12b which remain on or in the cutting board 24b are removed from the cutting board 24b, for instance by means of compressed air.

The cutting board 24b is represented in greater detail in FIGS. 4 to 7. The cutting board 24b has a supporting structure 36b, a stabilizing layer 38b, and a film layer 40b. The supporting structure 36b spans, on a side facing away from the film layer 40b, a supporting surface 32b, which, in the cutting process, supports the abrasive material parent web 18*b* against the underpressure. The supporting surface 32*b* thereby fixes the abrasive material parent web 18*b*.

The supporting structure 36*b* consists of a thermoplastic plastic, in this case of a polyethylene plastic. The supporting structure 36*b* delimits cavities 90*b*, through which the underpressure on a suction surface 34*b* acts on the abrasive material parent web 18*b*. The supporting structure 36*b* is configured as a honeycomb structure. The supporting surface 32*b* of the cutting board 24*b* is smaller than the suction surface 34*b* of the cavities 90*b*. In this case, a size of the supporting surface 32*b* of the cutting board 24*b* measures less than 10% of a size of the suction surface 34*b*.

The film layer 40*b* is bonded to the supporting structure 36*b*. The film layer 40*b* is formed of a thermoplastic plastic, in this case of a polypropylene plastic. The film layer 40*b* delimits the cavities 90*b* on a side facing away from the supporting surface 32*b*. The film layer 40*b* delimits suction openings 42*b*. Through the suction openings 42*b*, a gas volume flow 70*b* is sucked out of the cavities 90*b* by the suction device 86*b*. The suction openings 42*b* are configured as recesses defined in a slit shape. The suction openings 42*b* respectively enable a gas volume flow 70*b* out of several of the cavities 90*b*. Alternatively, suction openings can be made in a film layer in some other way which appears sensible to the person skilled in the art, for instance by a perforation and/or punch hole. The stabilizing layer 38*b* is configured as a nonwoven layer. The stabilizing layer 38*b* protects the film layer 40*b* from damage.

In this illustrative embodiment, the cutting board 24*b* is guided as a continuous band through the laser device 14*b*. Alternatively, the cutting board 24*b* can be guided into the laser device 14*b* in some other way which appears sensible to the person skilled in the art, for instance as tiles guided one behind the other.

The grinding tools 10*b* are taken down from the cutting board 24*b* by the pickup robot 58*b*. The pickup robot 58*b* is configured as a "pick & place robot".

What is claimed is:

1. A method of manufacturing a grinding tool which includes a binding agent based on aromatic molecules, the method comprising:
    cutting a region of an abrasive parent web with a laser device to form at least one inner contour of a grinding tool, the region of the abrasive parent web supported only by adjoining regions of the abrasive parent web during cutting;
    punching out an outer contour of the grinding tool from the abrasive material parent web; and
    applying a synchronization marking to the abrasive material parent web with the laser device.

2. The method according to claim 1, wherein the inner contour defines a grinding dust extraction opening.

3. A method of manufacturing a grinding tool that includes a binding agent based on aromatic molecules, the method comprising:
    cutting an abrasive parent web with a laser device to form at least one inner contour and one outer contour of a grinding tool; and
    extensively evacuating soot particles formed during the cutting of the inner and outer contours of the grinding tool,
    wherein during the cutting of the inner and outer contours of the grinding tool, the grinding tool is fixed on a cutting board by generating a gas pressure on a side of the grinding tool that is facing toward the cutting board which is less than a gas pressure on a side of the grinding tool that is facing away from the cutting board.

* * * * *